United States Patent [19]

Schneider

[11] 3,938,116

[45] Feb. 10, 1976

[54] LEAK DETECTION DEVICE

[75] Inventor: Helmut L. Schneider, Toronto, Canada

[73] Assignee: The Molson Companies Limited, Rexdale, Canada

[22] Filed: Aug. 12, 1974

[21] Appl. No.: 496,400

[30] Foreign Application Priority Data

Apr. 22, 1974  Canada ................................ 197942

[52] U.S. Cl. .................... 340/242; 198/40; 340/259
[51] Int. Cl.² ......................................... G08B 21/00
[58] Field of Search ...... 340/242, 259, 235; 198/40; 73/40; 307/118

[56] References Cited
UNITED STATES PATENTS 2,680,834  6/1954  Burns et al. ...................... 340/235 X
3,141,129  7/1964  Dietert ............................ 340/235 X

FOREIGN PATENTS OR APPLICATIONS 232,331  2/1961  Australia ............................ 340/235

Primary Examiner—John W. Caldwell
Assistant Examiner—Daniel Myer
Attorney, Agent, or Firm—Anthony J. Casella

[57] ABSTRACT

The invention relates to a leak detection device comprising a pair of metal probes which are positioned on a conveyor to detect leakage from broken bottles within a cardboard carton or carrier and which probes are connected to a suitable alarm system and/or the conveyor controls.

1 Claim, 4 Drawing Figures

LEAK DETECTION DEVICE

This invention relates to a leak detection device which is particularly suitable for use in brewing and other beverage industries.

As is well known, bottled beverages are quite often sold in cardboard cartons or cardboard "pop" carriers. The cardboard is either corrugated cardboard or what is known in the trade as hard or chip-board. When filled bottles are placed in the cartons or carriers, it sometimes happens that one bottle is fractured thus permitting its liquid contents to escape on to the inner surface of the bottom flaps of the carton or carrier. This escaping liquid, quite obviously, will soak into the said flaps so that, at the end of the filling line, when the cartons or carriers are lifted, the bottom will collapse and the remaining filled bottles drop to the floor with disasterous results.

It is an object of the invention, therefore, to provide a simple and inexpensive leak detection device for incorporation with a bottled beverage carton or carrier filling line.

The invention is illustrated in the accompanying drawings in which.

Figure 1:
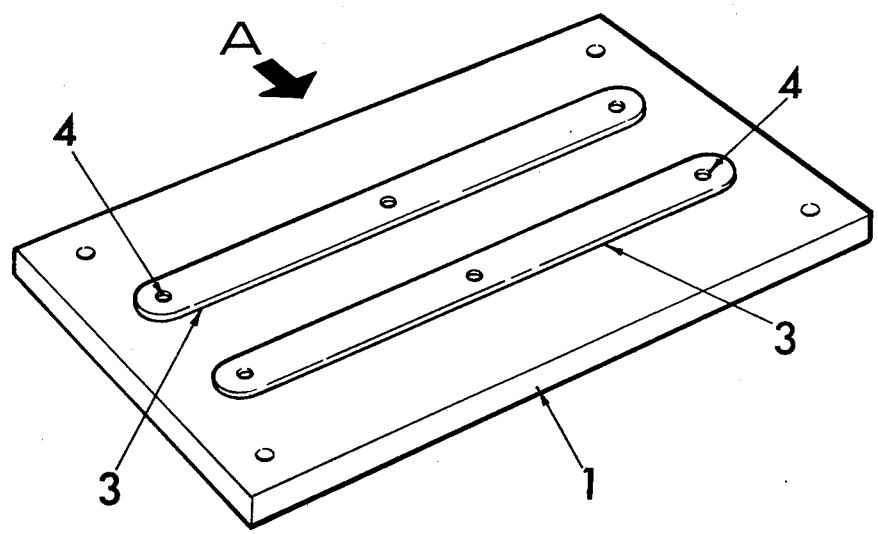
FIG. 1 is a perspective plan view of the leak detection sensor plate.
Figure 2:
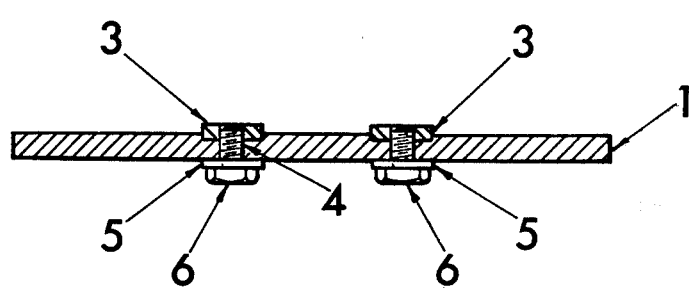
FIG. 2 is a side elevation of FIG. 1.
Figure 3:
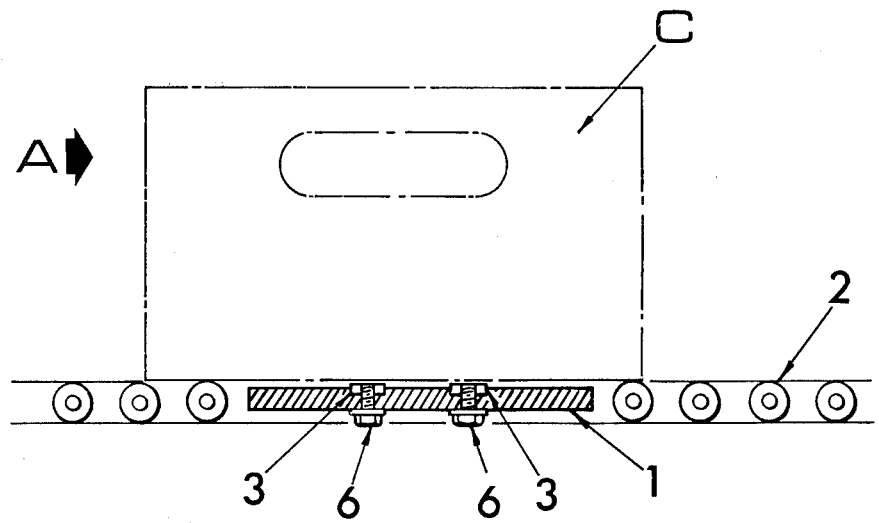
FIG. 3 is a diagrammatic side view of the sensor plate shown incorporated in a carton filling line.

Referring to the drawings, and in particular to FIG. 1, the leak detection device is of simple construction but is nonetheless efficient in its operation; basically, it includes a sensor plate 1 which is mounted so as to be part of the normal carton conveying line indicated generally at 2 in FIG. 3.

The plate 1 includes a pair of parallel, but spaced, copper bars 3 which are secured to the upper surface of said plate by means of recessed screws 4 which bars 3 extend normal to the path of travel, indicated by arrow A, of the cartons along the conveying line.

The screws 4 extend through the plate 1 and project from its undersurface and are each connected to a sensing conductor 5 by means of a nut 6.

Figure 4:
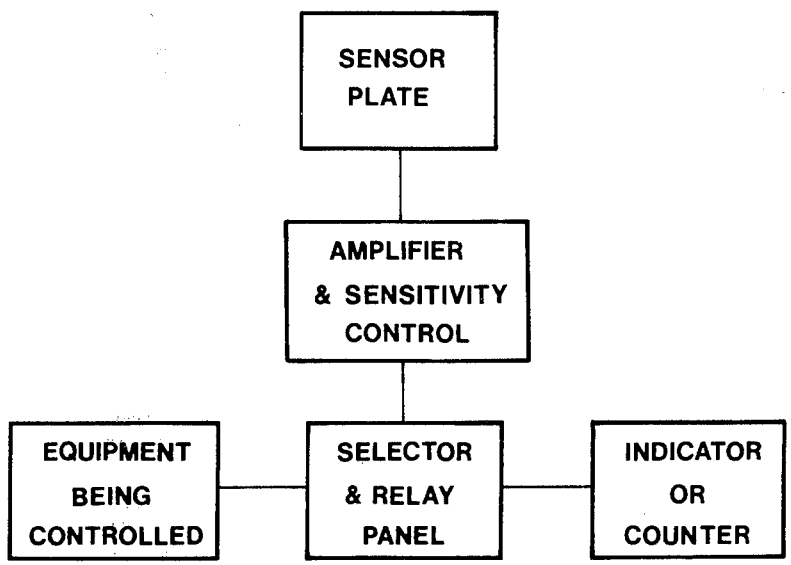
FIG. 4 is a block diagram.

Accordingly, filled cartons C (see FIG. 3) pass along the path of travel A in normal fashion and over the leak detection device located in said path of travel. However, if breakage has occurred within a carton and the bottom has become saturated owing to seepage, the passage of such a carton over the plate 1 will cause the pair of bars or electrodes 3 to sense the moisture and to relay a signal to an amplifier and sensitivity control (see FIG. 4) and from thence to a selector and relay panel. The latter will then activate a visual and/or audio indicator or alarm and shut down the palletizing machine and line until the damaged carton or case has been removed.

I claim:

1. In combination
   a. a conveyor for conveying containers formed of absorbent material and containing frangible bottles filled with liquid;
   b. a sensor plate, having an upper surface, forming part of the conveyor and arranged in the path of travel of said containers;
   c. a pair of parallel, spaced, copper, sensing bars detachably secured to said upper surface, projecting therefrom and extending normal to said path of travel for sensing the moisture content of the bottom of each said container;
   d. at least one sensing conductor connected to each said bar;
   e. an amplifier and sensitivity control electrically connected to said sensor plate and to
   f. a selector and relay panel which, in turn, is electrically connected to
   g. an alarm and to said conveyor to activate the former and deactivate the latter when said bars detect any moisture emanating from containers passing over said bars.

* * * * *